US011693273B2

(12) United States Patent
Tsang et al.

(10) Patent No.: US 11,693,273 B2
(45) Date of Patent: Jul. 4, 2023

(54) LIGHT SOURCE MODULE AND DISPLAY DEVICE

(71) Applicant: Coretronic Corporation, Hsin-Chu (TW)

(72) Inventors: Chih-Jen Tsang, Hsin-Chu (TW);
Ying-Hsiang Chen, Hsin-Chu (TW);
Chung-Wei Huang, Hsin-Chu (TW);
Chun-Chi Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/226,092

(22) Filed: Apr. 9, 2021

(65) Prior Publication Data

US 2021/0325732 A1 Oct. 21, 2021

(30) Foreign Application Priority Data

Apr. 20, 2020 (CN) .......................... 202020589331.4

(51) Int. Cl.
*G02F 1/13357* (2006.01)

(52) U.S. Cl.
CPC .. *G02F 1/133605* (2013.01); *G02F 1/133606* (2013.01); *G02F 1/133603* (2013.01)

(58) Field of Classification Search
CPC ..... F21K 9/62; F21K 9/64; F21K 9/68; G02F 1/133605; G02F 1/133606; G02F 1/133603; H01L 33/52; H01L 33/60; G02B 6/0055

See application file for complete search history.

(56) References Cited

U.S. PATENT DOCUMENTS

| | | | | |
|---|---|---|---|---|
| 9,715,058 B1* | 7/2017 | Zhang | .................. | G02B 6/0061 |
| 10,782,563 B2* | 9/2020 | Lee | ........................ | G02B 30/35 |
| 10,953,805 B2* | 3/2021 | Park | ......................... | B60R 1/12 |
| 2010/0149787 A1* | 6/2010 | Zhang | .................. | G02B 6/0043 |
| | | | | 362/327 |
| 2011/0051397 A1* | 3/2011 | Bae | ...................... | G02B 6/0073 |
| | | | | 362/97.1 |
| 2015/0049510 A1* | 2/2015 | Haiberger | ............ | G02B 6/0068 |
| | | | | 362/612 |
| 2015/0159834 A1* | 6/2015 | Chang | ............... | G02F 1/133603 |
| | | | | 362/297 |
| 2020/0300444 A1* | 9/2020 | Lee | ...................... | H01L 25/0753 |
| 2021/0055607 A1* | 2/2021 | Lee | ................... | G02F 1/133608 |
| 2021/0239298 A1* | 8/2021 | Hashimoto | .......... | G02B 6/0078 |
| 2021/0341666 A1* | 11/2021 | Lu | ..................... | G02F 1/133603 |

FOREIGN PATENT DOCUMENTS

| | | | | |
|---|---|---|---|---|
| CN | 102483538 B | | 4/2016 | |
| CN | 108267893 A | | 7/2018 | |
| KR | 20130095939 A | * | 8/2013 | |
| KR | 20160076346 A | * | 6/2016 | ......... G02F 1/01791 |

* cited by examiner

*Primary Examiner* — Erin Kryukova (57) ABSTRACT

A light source module includes a substrate, a light-emitting element, an optical adhesive layer and a reflective structure. The light-emitting element is disposed on the substrate. The optical adhesive layer is disposed on the substrate and covers the light-emitting element. The reflective structure is disposed in the optical adhesive layer and located above the light-emitting element. A display device using the aforementioned light source module is also provided. The light source module provided by the invention has the function of protecting the light-emitting element and improves the problem of the large thickness of the direct-type backlight module in prior art.

6 Claims, 8 Drawing Sheets

LIGHT SOURCE MODULE AND DISPLAY DEVICE

CROSS-REFERENCE TO RELATED APPLICATION

This application claims the priority benefit of China application 202020589331.4, filed on 2020 Apr. 20. The entirety of the above-mentioned patent application is hereby incorporated by reference herein and made a part of this specification.

FIELD OF THE INVENTION

The invention relates to a light source module, and more particularly to a light source module that can be used in a display device and a display device using the light source module.

BACKGROUND OF THE INVENTION

The liquid crystal display device includes a liquid crystal display panel and a backlight module. Since the liquid crystal display panel itself does not emit light, it is necessary to rely on the backlight module to provide the surface light source for display to the liquid crystal display panel. Therefore, the main function of the backlight module is to provide a surface light source with high brightness and high uniformity.

Conventionally, the backlight modules can be divided into edge-type backlight modules and direct-type backlight modules. In general, the light source of the edge-type backlight module is disposed on the side of the light guide plate, so it has the advantage of being thinner. The light source of the direct-type backlight module is disposed under the optical plate, so it has the advantage of better uniformity, but the overall thickness is relatively large due to the need for a larger light mixing distance.

The information disclosed in this "BACKGROUND OF THE INVENTION" section is only for enhancement understanding of the background of the described technology, and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source module, which has the function of protecting the light-emitting element and improves the problem of the large thickness of the direct-type backlight module in prior art.

The invention provides a display device with the advantage of smaller thickness.

Other advantages and objects of the invention may be further illustrated by the technical features broadly embodied and described as follows.

In order to achieve one or a portion of or all of the objects or other objects, a light source module provided in an embodiment of the invention includes a substrate, a light-emitting element, an optical adhesive layer and a reflective structure. The light-emitting element is disposed on the substrate. The optical adhesive layer is disposed on the substrate and covers the light-emitting element. The reflective structure is disposed in the optical adhesive layer and located above the light-emitting element.

In order to achieve one or a portion of or all of the objects or other objects, a display device provided in an embodiment of the invention includes a display panel and the aforementioned light source module. The display panel is disposed on a light emitting side of the light source module.

The light source module of this embodiment covers the light-emitting element with the optical adhesive layer, which can act as a buffer when the light source module receives an external force, so as to achieve the function of protecting the light-emitting element. In addition, the combination of the optical adhesive layer and the reflective structure can be used to guide light, so that the light is transmitted to the periphery of the optical adhesive layer to improve the light uniformity. Compared with the direct-type backlight module in prior art, the light source module of the embodiment of the invention does not require additional light mixing space and has the advantage of being thinner due to the smaller optical distance (OD). Because of using the above-mentioned light source module, the display device of the embodiment of the invention also has the advantage of being thinner.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described.

The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
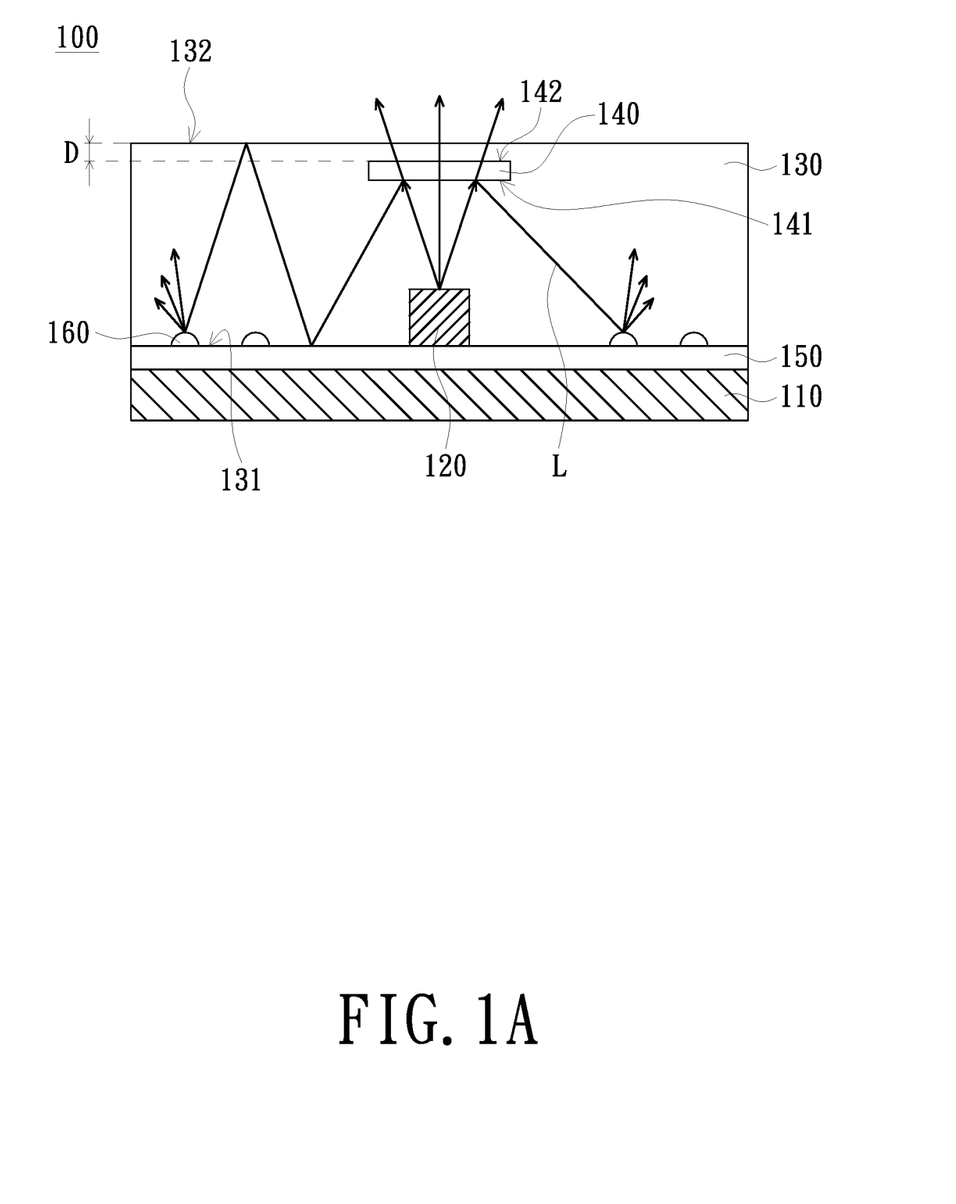
FIGS. 1A-1C are schematic cross-sectional views of a light source module according to different embodiments of the invention.
Figure 2:
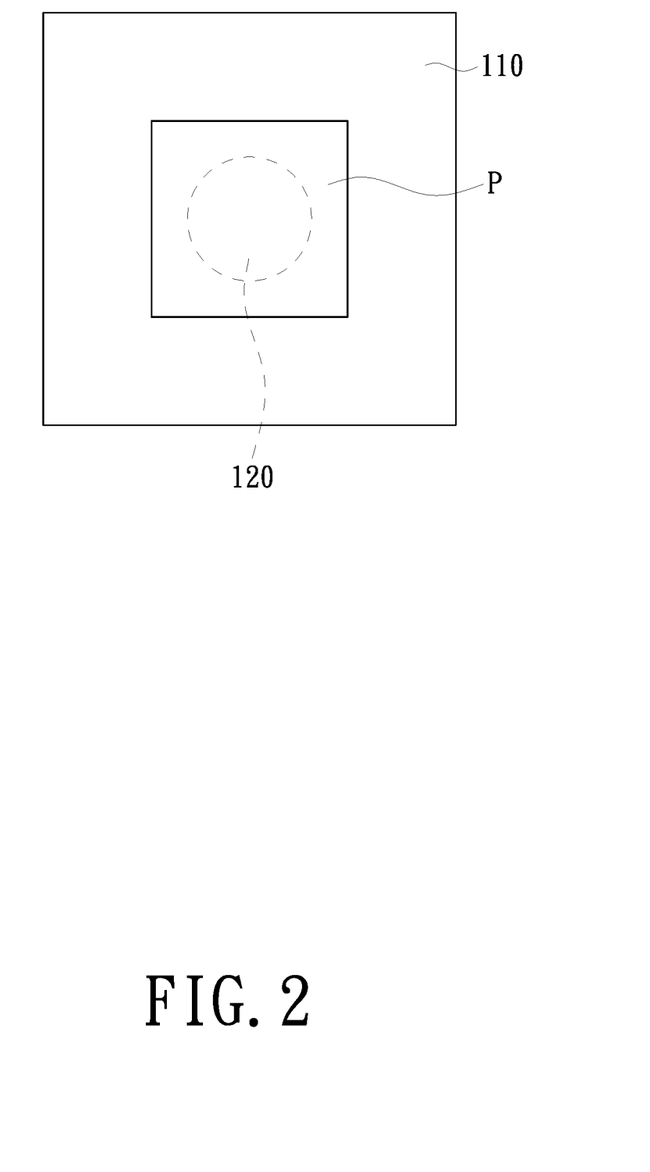
FIG. 2 is a schematic view of an orthographic projection of a reflective structure of FIG. 1 onto a substrate.

FIG. 1 is a schematic cross-sectional view of a light source module according to an embodiment of the invention. FIG. 2 is a schematic view of an orthographic projection of a reflective structure of FIG. 1 onto a substrate. Please refer to FIG. 1 first. The light source module 100 of this embodiment includes a substrate 110, a light-emitting element 120, an optical adhesive layer 130 and a reflective structure 140. The light-emitting element 120 is disposed on the substrate 110. The optical adhesive layer 130 is disposed on the substrate 110 and covers the light-emitting element 120. The optical adhesive layer 130 is formed by heating and curing, for example, an optical adhesive material with adhesive and light guiding functions. The optical adhesive layer 130 has a first surface 131 and a second surface 132 opposite to each other. The first surface 131 faces the substrate 110, and the second surface 132 is away from the substrate 110. Specifically, the optical adhesive layer 130 is attached and contacted to the surface of the light-emitting element 120, and the first surface 131 is attached and contacted to the substrate 110. That is, there is no gap between the optical adhesive layer 130, the light-emitting element 120 and the substrate 110, and thus, the light-emitting element 120 can be fixed to avoid falling off from the substrate 110. The reflective structure 140 is disposed in the optical adhesive layer 130 and is located above the light-emitting element 120. Specifically, the reflective structure 140 is covered by the optical adhesive layer 130 above the light-emitting element 120, that is, the reflective structure 140 can be regarded as being embedded in the optical adhesive layer 130, and the reflective structure 140 and the light-emitting element 120 are spaced apart through the optical adhesive layer 130. The invention does not limit the numbers of the light-emitting elements 120 and the reflective structures 140. In other embodiments, each reflective structure 140 corresponds to, for example, one light-emitting element 120 when the numbers of the light-emitting elements 120 and the reflective structures 140 are plural. Please refer to FIG. 2. The orthographic projection P of the reflective structure 140 on the substrate 110 covers, for example, the light-emitting element 120 (indicated by a dashed line), but the invention is not limited thereto.

The substrate 110 is, for example, a printed circuit board and is used to carry and electrically connect the light-emitting element 120. The light-emitting element 120 is driven to emit light through the substrate 110.

The light-emitting element 120 is used to provide light L. The light-emitting element 120 can be a light-emitting diode (LED), but the invention does not limit the type of the light-emitting element 120. The light-emitting element 120 is, for example, a Lambertian light source.

If necessary, the light source module 100 in this embodiment may further include, for example, a reflective layer 150 disposed on the side of the substrate 110 facing the optical adhesive layer 130. The light-emitting element 120 and the optical adhesive layer 130 are, for example, disposed on the reflective layer 150, but the invention is not limited thereto. In another embodiment, the light L emitted from the light-emitting element 120 may pass through the reflective layer 150 and the light-emitting element 120 is directly disposed on the substrate 110. The reflective layer 150 may be a highly reflective white paint coating to reflect light emitted from under the optical adhesive layer 130 back into the optical adhesive layer 130, thereby improving light utilization efficiency; however, the invention is not limited thereto. The reflective layer 150 may not be provided as required.

Figure 1B:
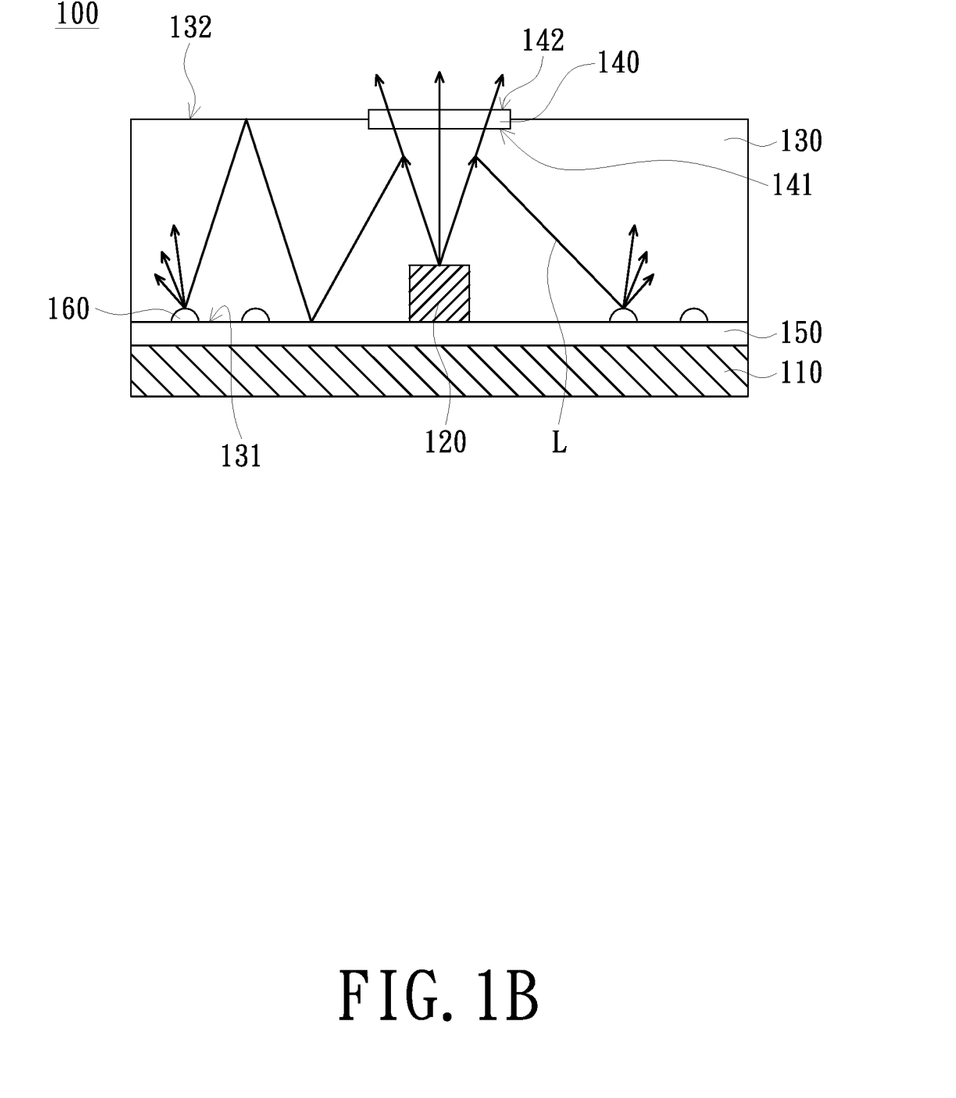
Figure 1C:
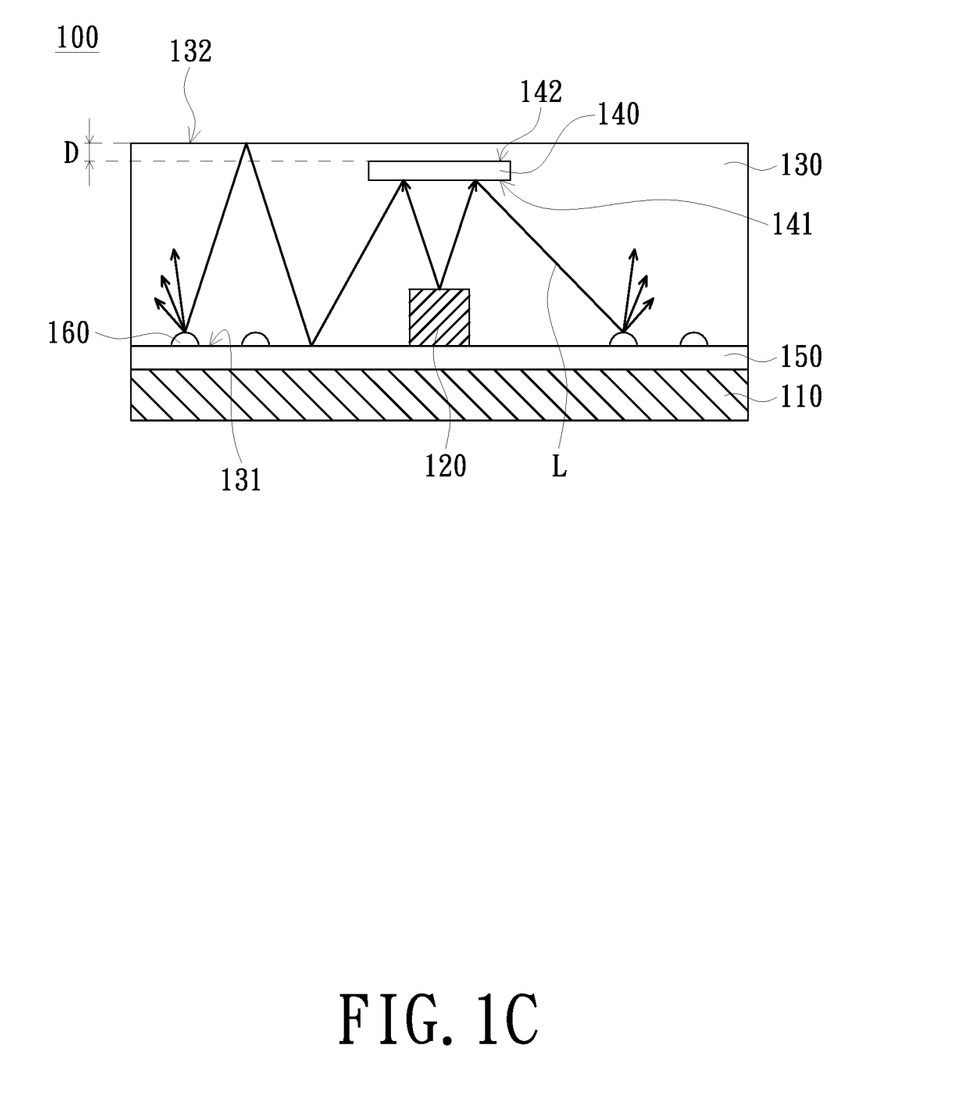

The reflective structure 140 includes a material with reflective characteristics such as white paint coating. The reflective structure 140 may be, for example, a transflective structure or a total reflective structure. Taking FIG. 1A as an example, when the reflective structure 140 is a transflective structure, part of the light L emitted from the light-emitting element 120 toward the reflective structure 140 directly passes through the reflective structure 140, and the other part of the light L is reflected by the reflective structure 140 and transmitted to the periphery of the optical adhesive layer 130, thereby improving the light uniformity. In another embodiment in which the reflective structure 140 is a total reflective structure, all the light L emitted from the light-emitting element 120 toward the reflective structure 140 is reflected (e.g., FIG. 1C). In this case, by providing a distance D between the reflective structure 140 and the second surface 132, the light guiding effect can be achieved and the decreased brightness above the light-emitting element 120 due to being shielded by the total reflective structure (reflective structure 140) is increased, thereby also improving the light uniformity. The invention does not limit the configuration distance between the reflective structure 140 and the second surface 132. For example, the reflective structure 140 may be exposed on the second surface 132 (e.g., FIG. 1B) when the reflective structure 140 is a transflective structure; that is, there is no distance between the reflective structure 140 and the second surface 132.

Figure 3A:
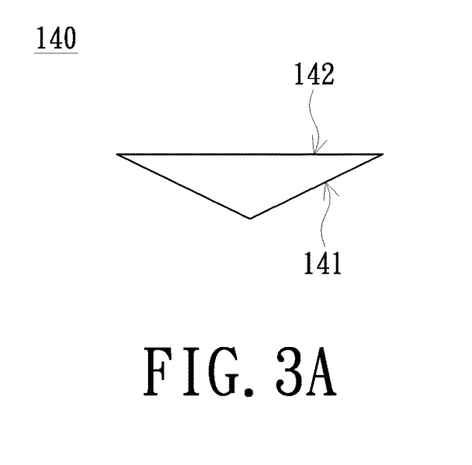
FIGS. 3A to 3E are schematic cross-sectional views of reflective structures according to other embodiments of the invention.
Figure 3B:
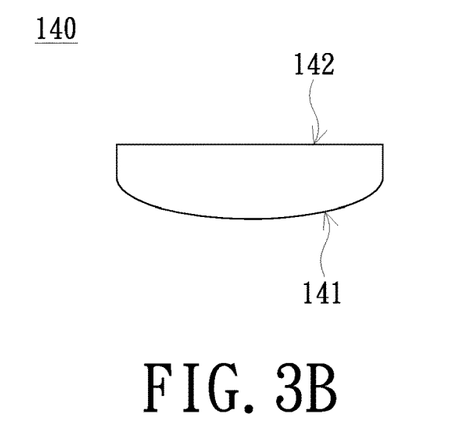
Figure 3C:
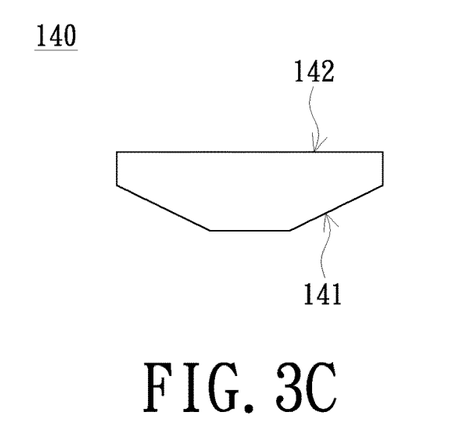
Figure 3D:
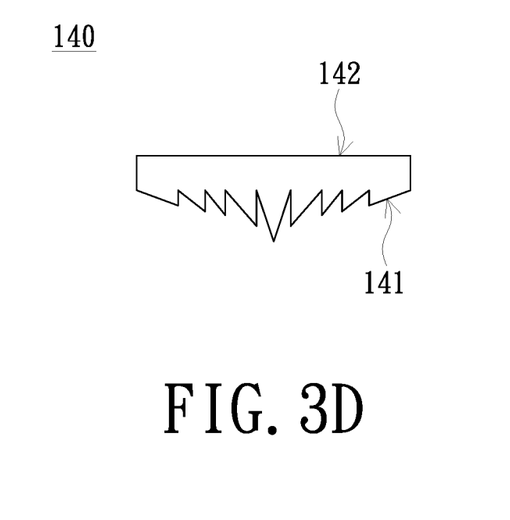
Figure 3E:
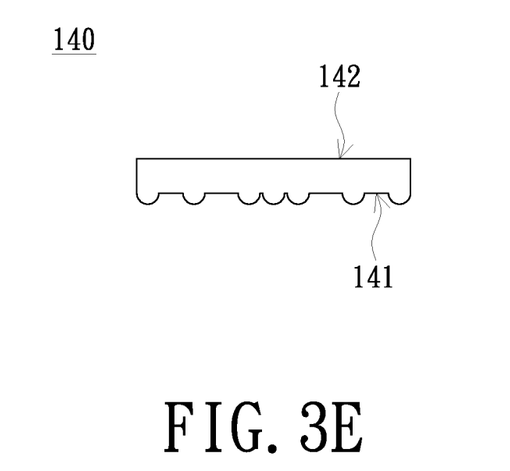

The reflective structure 140 includes, for example, different design shapes. FIGS. 3A to 3E are schematic cross-sectional views of the reflective structures according to other embodiments of the invention. Please refer to FIGS. 1 and 3A to 3E. The reflective structure 140 has a third surface 141 and a fourth surface 142 opposite to each other. The third surface 141 faces the substrate 110, and the fourth surface 142 is away from the substrate 110. The shape of the third surface 141 includes, for example, a flat shape (as shown in FIG. 1), a conical shape (as shown in FIG. 3A), a spherical shape (as shown in FIG. 3B), a truncated conical shape (as shown in FIG. 3C), a sawtooth shape (as shown in FIG. 3D), a concave-convex shape (as shown in FIG. 3E) or Fresnel shape (not shown), etc. The fourth surface 142 is a flat surface. The conical shape in FIG. 3A and the sawtooth shape in FIG. 3D are equivalent structures, and the sawtooth arrangement is a gradually changing triangular pyramid structure. The spherical shape in FIG. 3B and the concave-convex shape in FIG. 3E are equivalent structures, and the concave-convex arrangement uses the density change of the protrusions to achieve the same effect as the spherical shape. When the light source module 100 uses more than one light-emitting element 120, the reflective structure 140 with different design shapes can be used to adjust the light output angle according to the spacing and design of different light-emitting elements 120.

Please refer to FIG. 1. The light source module 100 may further include, for example, a plurality of microstructures 160 disposed on the substrate 110. In this embodiment, the microstructures 160 are disposed on the reflective layer 150 and are, for example, a concave-convex structure formed on the reflective layer 150. In another embodiment, when the light source module 100 does not include the reflective layer 150, the microstructures 160 may be disposed on the substrate 110, or the printed circuit traces on the substrate 110 may be directly used as the microstructures 160. The optical adhesive layer 130, for example, covers the microstructures 160. The microstructures 160 are adapted to destroy the total reflection of the light L in the optical adhesive layer 130, so that the light L is emitted from the second surface 132 to achieve the effect of adjusting the uniformity of the output light. The microstructures 160 may be black or white ink coatings, and the size and distribution density of the microstructures 160 can be adjusted according to design requirements, and the invention is not limited thereto.

The light source module 100 of this embodiment covers the light-emitting element 120 with the optical adhesive layer 130, which can act as a buffer when the light source module 100 receives an external force, so as to achieve the function of protecting the light-emitting element 120. In addition, the combination of the optical adhesive layer 130 and the reflective structure 140 can be used to guide light, so that the light L is transmitted to the periphery of the optical adhesive layer 130 to improve the light uniformity. Compared with the direct-type backlight module in prior art, the light source module 100 of the embodiment of the invention does not require additional light mixing space and has the advantage of being thinner due to the smaller optical distance.

Figure 4:
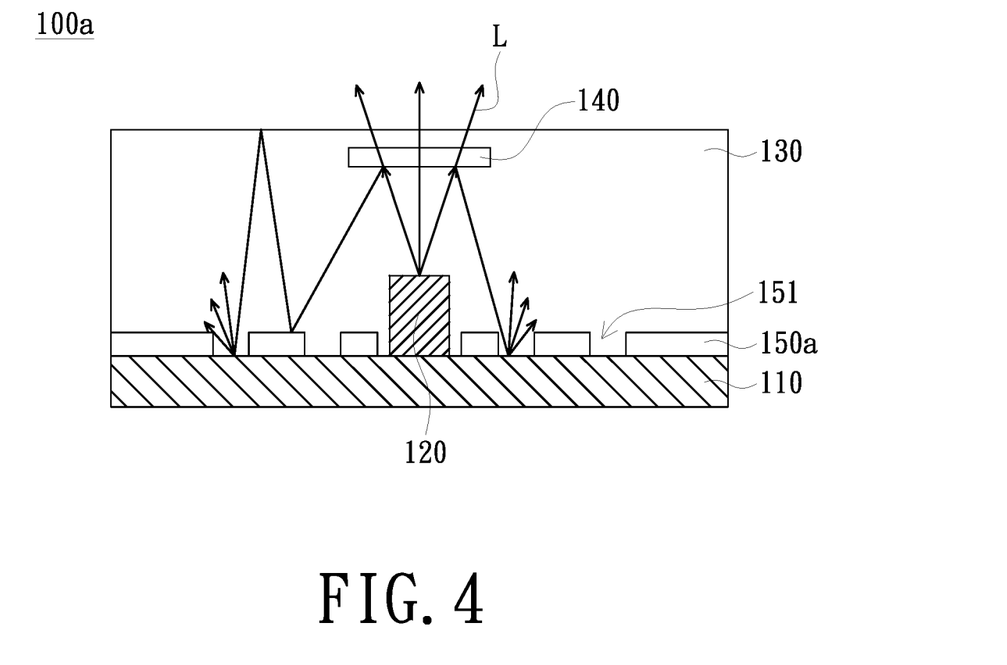
FIG. 4 is a schematic cross-sectional view of a light source module according to another embodiment of the invention.

FIG. 4 is a schematic cross-sectional view of a light source module according to another embodiment of the invention. Please refer to FIG. 4. The light source module 100a of this embodiment is similar to the above-mentioned light source module 100 in structure and advantages, and only the main differences in structure will be described below. The light source module 100a of this embodiment does not include a plurality of microstructures 160. The reflective layer 150a has a plurality of through holes 151 extending from a side facing the substrate 110 to a side away from the substrate 110. In this embodiment, the light-emitting element 120 passes through the through hole 151 and is directly disposed on the substrate 110, but the invention is not limited thereto. The light-emitting element 120 of the light source module 100a of this embodiment may be disposed on the reflective layer 150a like the light-emitting element 120 of the light source module 100. Although the light source module 100a of this embodiment does not include the microstructure 160, the same effect of adjusting the light uniformity as the microstructure 160 can also be achieved by changing the interface reflectivity of the through hole 151 and the thickness of the optical adhesive layer 130.

Figure 5:
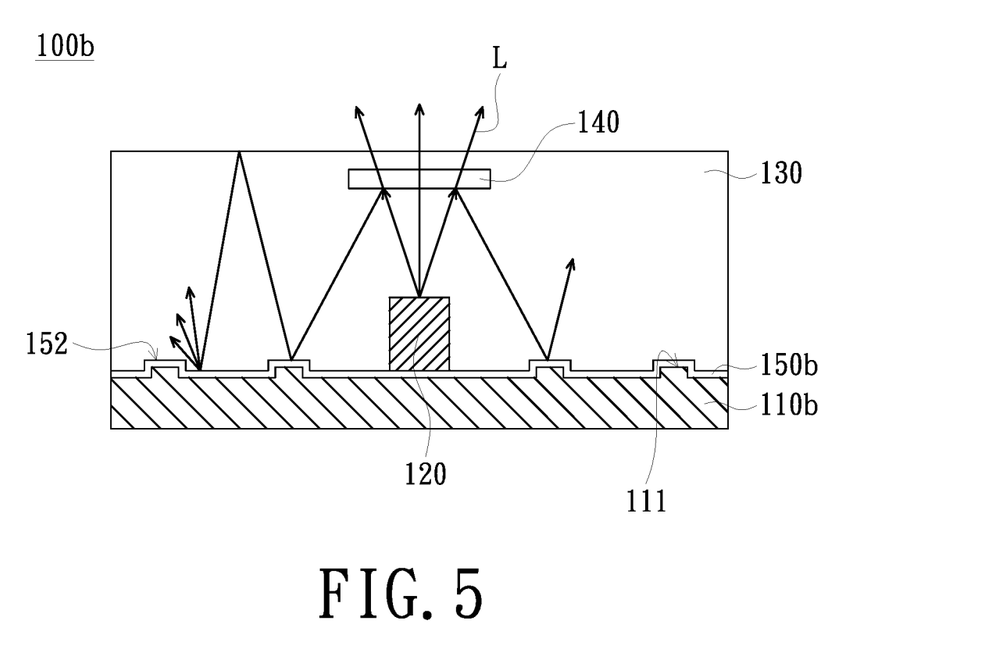
FIG. 5 is a schematic cross-sectional view of a light source module according to another embodiment of the invention.

FIG. 5 is a schematic cross-sectional view of a light source module according to another embodiment of the invention. Please refer to FIG. 5. The light source module 100b of this embodiment is similar to the above-mentioned light source module 100 in structure and advantages, and only the main differences in structure will be described below. The light source module 100b of this embodiment does not include the microstructures 160. The surface 111 of the substrate 110b facing the optical adhesive layer 130 is concave and convex, so that the surface 152 of the reflective layer 150b facing the optical adhesive layer 130 on the substrate 110b is also concave and convex. The same effect of adjusting the light uniformity as the microstructures 160 is also achieved by designing the height difference between the concave and convex.

Figure 6:
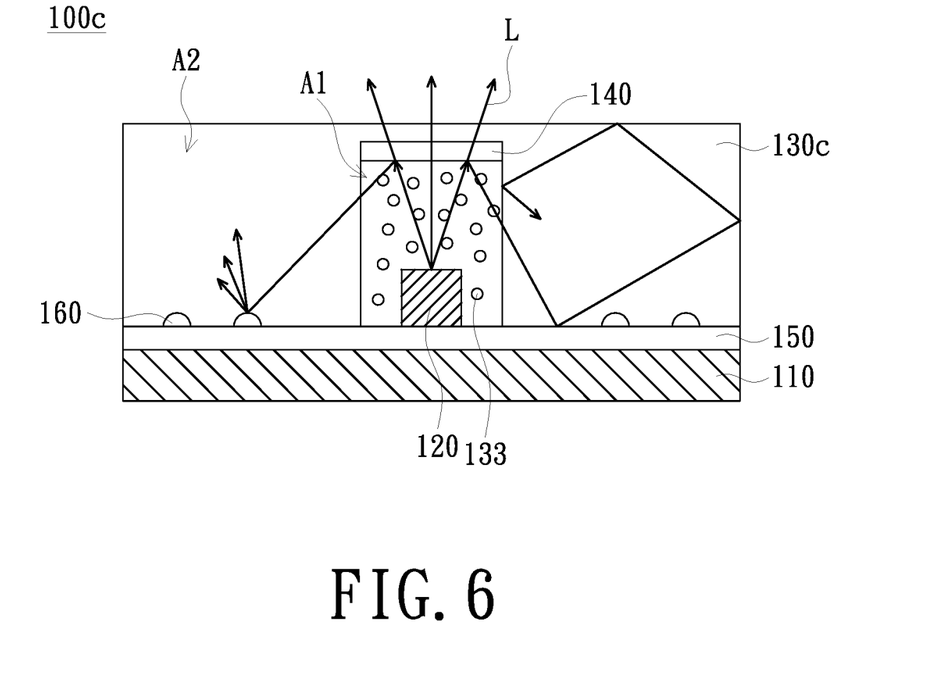
FIG. 6 is a schematic cross-sectional view of a light source module according to another embodiment of the invention.

FIG. 6 is a schematic cross-sectional view of a light source module according to another embodiment of the invention. Please refer to FIG. 6. The light source module 100c of this embodiment is similar to the above-mentioned light source module 100 in structure and advantages, and only the main differences in structure will be described below. In the light source module 100c of this embodiment, the optical adhesive layer 130c has a first area A1 and a second area A2. The first area A1 encloses the light-emitting elements 120, and the second area A2 encloses the first area A1. The first area A1 is, for example, an area between the reflective structure 140 and the substrate 110 when the reflective structure 140 is orthographically projected on the substrate 110, but the invention is not limited thereto. When the number of the light-emitting elements 120 is plural, the optical adhesive layer 130c has, for example, a plurality of first areas A1 having a number corresponding to the number of the light-emitting elements 120, and the second area A2 encloses the first areas A1. The first area A1 includes, for example, a plurality of wavelength conversion particles 133, and the light wavelength of the light L can be converted through the first area A1.

The first area A1 and the second area A2 use different optical glues, for example. The first area A1 has a first refractive index n1, and the second area A2 has a second refractive index n2, wherein n1<n2. Through the difference in refractive index, the light L entering the first area A1 from the second area A2 is reflected back to the second area A2 by the interface reflection, and the light L reaching a certain angle may be even totally reflected at the interface between the first refractive index n1 and the second refractive index n2. By reducing the proportion of the light L entering the first area A1 from the second area A2, the light L entering the first area A1 from the second area A2 is not re-absorbed by the light-emitting element 120, which can improve the luminous efficiency.

Figure 7:
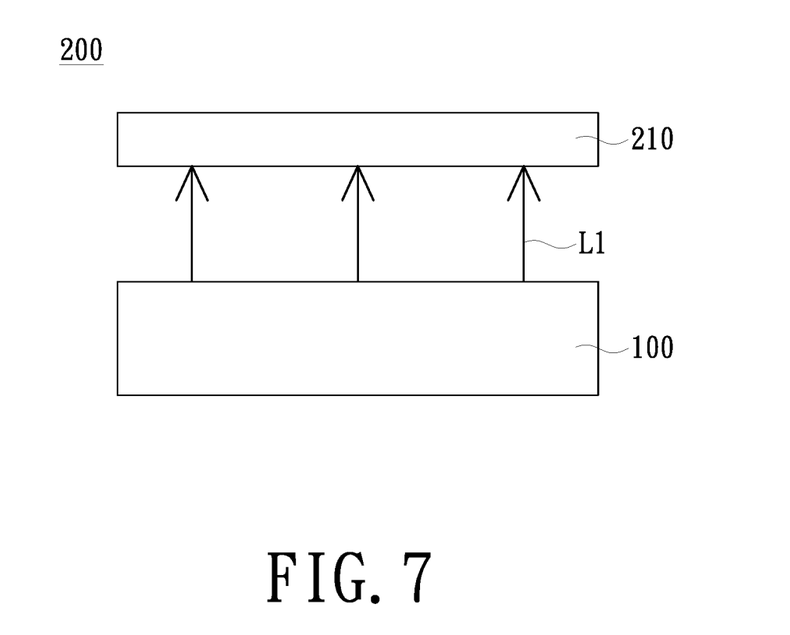
FIG. 7 is a schematic cross-sectional view of a display device according to an embodiment of the invention.

FIG. 7 is a schematic cross-sectional view of a display device according to an embodiment of the invention. Please refer to FIG. 7. The display device 200 of this embodiment includes the above-mentioned light source module 100 and a display panel 210. The display panel 210 is disposed on the light emitting side of the light source module 100. The display panel 210 may be a liquid crystal display panel or other non-self-luminous display panels. The light source module 100 is used as a display light source to provide a surface light source L1 to the display panel 210. The light source module 100 of the display device 200 can be replaced with the light source module of any of the above embodiments. Since the light source module 100 of the display device 200 of this embodiment uses a smaller optical distance and has the advantage of being thinner, the overall thickness of the display device 200 can be reduced.

In summary, the light source module of this embodiment covers the light-emitting element with the optical adhesive layer, which can act as a buffer when the light source module receives an external force, so as to achieve the function of protecting the light-emitting element. In addition, the combination of the optical adhesive layer and the reflective structure can be used to guide light, so that the light is transmitted to the periphery of the optical adhesive layer to improve the light uniformity. Compared with the direct-type backlight module in prior art, the light source module of the embodiment of the invention does not require additional light mixing space and has the advantage of being thinner due to the smaller optical distance. Because of using the above-mentioned light source module, the display device of the embodiment of the invention also has the advantage of being thinner.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface, the second surface, the third surface, the fourth surface, the first area, the second area, the first refractive index and the second refractive index are only used for distinguishing various elements and do not limit the number of the elements.

What is claimed is:

1. A light source module, comprising a substrate, at least one light-emitting element, an optical adhesive layer and a reflective structure, wherein:
   the at least one light-emitting element is disposed on the substrate and configured to provide a light;
   the optical adhesive layer is disposed on the substrate and covers the at least one light-emitting element, and comprises a first surface and a second surface opposite to each other, the first surface faces the substrate, and the second surface is away from the substrate; and
   the reflective structure is disposed in the optical adhesive layer and located above the at least one light-emitting element, a part of light emitted from the at least one light-emitting element toward the reflective structure directly passes through the reflective structure, and the other part of the light is reflected by the reflective structure, wherein a width of the reflective structure is greater than or equal to a width of the at least one light-emitting element, and a thickness of the reflective structure is greatest at its center, and a thickness outside the center is less than the thickness at the center,
   wherein the light source module further comprises a reflective layer disposed on the substrate.

2. The light source module according to claim 1, wherein there is a distance between the reflective structure and the second surface.

3. The light source module according to claim 1, wherein the reflective structure is exposed on the second surface.

4. The light source module according to claim 1, wherein the reflective structure is a transflective structure.

5. The light source module according to claim 1, wherein the reflective structure has a third surface and a fourth surface opposite to each other, the third surface faces the substrate, the fourth surface is away from the substrate, a shape of the third surface comprises a conical shape, a spherical shape, a truncated conical shape, or a sawtooth shape, and the fourth surface is a flat surface.

6. A display device, comprising a light source module and a display panel, wherein:
   the light source module comprises a substrate, at least one light-emitting element, an optical adhesive layer and a reflective structure, wherein:
      the at least one light-emitting element is disposed on the substrate and configured to provide a light;
      the optical adhesive layer is disposed on the substrate and covers the at least one light-emitting element, and comprises a first surface and a second surface opposite to each other, the first surface faces the substrate, and the second surface is away from the substrate; and
      the reflective structure is disposed in the optical adhesive layer and located above the at least one light-emitting element, a part of light emitted from the at least one light-emitting element toward the reflective structure directly passes through the reflective structure, and the other part of the light is reflected by the reflective structure, wherein a width of the reflective structure is greater than or equal to a width of the at least one light-emitting element, and a thickness of the reflective structure is greatest at its center, and a thickness outside the center is less than the thickness at the center; and the display panel is disposed on a light emitting side of the light source module, wherein the light source module further comprises a reflective layer disposed on the substrate.

* * * * *